United States Patent
Kameda et al.

[11] Patent Number: 5,844,999
[45] Date of Patent: Dec. 1, 1998

[54] DEVICE FOR AND METHOD OF ATTACHING A SPEAKER

[75] Inventors: Yoshihisa Kameda, Tokyo, Japan; Hong Jong Nam, Seoul, Rep. of Korea

[73] Assignee: Sony Corporation, Tokyo, Japan

[21] Appl. No.: 922,250

[22] Filed: Sep. 2, 1997

Related U.S. Application Data

[62] Division of Ser. No. 785,970, Jan. 22, 1997.

[30] Foreign Application Priority Data

Jan. 30, 1996 [JP] Japan ................................ P08-035470

[51] Int. Cl.$^6$ .................................................. H04R 25/00
[52] U.S. Cl. ........................... 381/386; 381/189; 381/391
[58] Field of Search ..................................... 381/192, 193, 381/188, 205, 189, 396, 398, 391, 395; 29/594, 609.1; 181/148, 199, 171

[56] References Cited

U.S. PATENT DOCUMENTS 3,404,053 10/1968 Tokuma et al. ........................... 29/594
4,191,865 3/1980 King et al. ............................... 381/193

*Primary Examiner*—Huyen Le
*Attorney, Agent, or Firm*—Jay H. Maioli

[57] ABSTRACT

A method of and a device for attaching a speaker to a synthetic resin body having an opening in which the speaker's elevating edge of a cylindrical shape integrally formed at a tip end portion of a metal frame, is confronted with the synthetic resin body so as to surround and close the opening. The elevating edge is heated and the speaker is pushed toward the synthetic resin body side, the synthetic resin body is fused by heating at its location where it contacts the heated elevating edge and the elevating edge is fitted into the synthetic resin body by a pressing force, whereafter the speaker is attached to the synthetic resin body by solidifying the synthetic resin body after the heating has been stopped.

4 Claims, 5 Drawing Sheets

5,844,999

DEVICE FOR AND METHOD OF ATTACHING A SPEAKER

This is a division of application Ser. No. 08/785,970 filed Jan. 22, 1997.

BACKGROUND OF THE INVENTION

1. Field of the Invention

The present invention relates to a device for and a method of attaching a speaker and particularly to a device for and a method of attaching a speaker to an attaching position of a cabinet made of synthetic resin.

2. Description of the Related Art

A cassette tape recorder with a radio receiver, for example, includes a speaker for emanating sounds reproduced by the radio receiver or the tape recorder. The speaker is attached to an open portion from the rear surface of a front cabinet. The speaker is protected at its front surface side by a metal protective mesh-like cover attached to a front surface of the cabinet.

When the speaker is attached to the inside of the cabinet, the speaker is attached to the inside of the cabinet by screws fitted into bosses formed on the rear surface of the front cabinet or by sheet metal or wire spring serving as attachment assemblies.

The method of attaching a speaker to a cabinet has so far required attachment assemblies such as screws, sheet metal or wire spring fitted into bosses. In the device for attaching a speaker to a cabinet by screws, screws are loosened by vibration of the speaker as the speaker has been operated for a long period of time so that shaky sounds are generated when the speaker is driven, degrading quality of sound.

SUMMARY OF THE INVENTION

It is therefore an object of the present invention to provide a device for and a method of attaching a speaker in which special attachment assemblies are not required.

It is another object of the present invention to provide device for and method of attaching a speaker in which noisy sound can be prevented from being generated when a speaker is driven, thereby avoiding a problem from a standpoint of quality of sound.

It is a further object of the present invention to provide a device for and a method of attaching the speaker in which a time required for attaching a speaker can be reduced.

According to the present invention, there is provided a device for attaching a speaker in which a frame of a speaker is molded by a magnetic material such as iron, an elevating edge portion formed on an outer peripheral side of the frame is fitted into a predetermined position of a cabinet made of a synthetic resin and the speaker is attached to the cabinet by fusing by induction heating a portion of the cabinet opposing the edge portion.

A cylindrical rib may be formed on the front cabinet at its position where the speaker is attached, and an elevating edge of the frame of the speaker may be placed at the inside of the cylindrical rib. Moreover, openings, slits or tabs for preventing a speaker from being detached from a front cabinet may be formed at the elevating edge portion of the frame, and the speaker can be more reliably attached to the front cabinet by filling the openings, slits or tabs with fused resin.

According to the present invention, there is provided a method of attaching a speaker to a front cabinet in which an elevating edge portion formed on a speaker around its outer peripheral side and a frame made of a magnetic material, in particular, a ferromagnetic material such as iron is pressed by induction heating generated on application of an external magnetic field to the elevating edge portion. The speaker is attached to a cabinet made of a synthetic resin by fitting the fused edge portion into the inner surface of the cabinet by heating.

A protective mesh-like cover made of a magnetic material, in particular, ferromagnetic material such as iron for covering a cabinet at its opening where the speaker is attached may be attached to the cabinet by induction heating at the same time the speaker is attached to the cabinet.

DETAILED DESCRIPTION OF THE PREFERRED EMBODIMENTS

The present invention will now be described with reference to the drawings.

Figure 1:
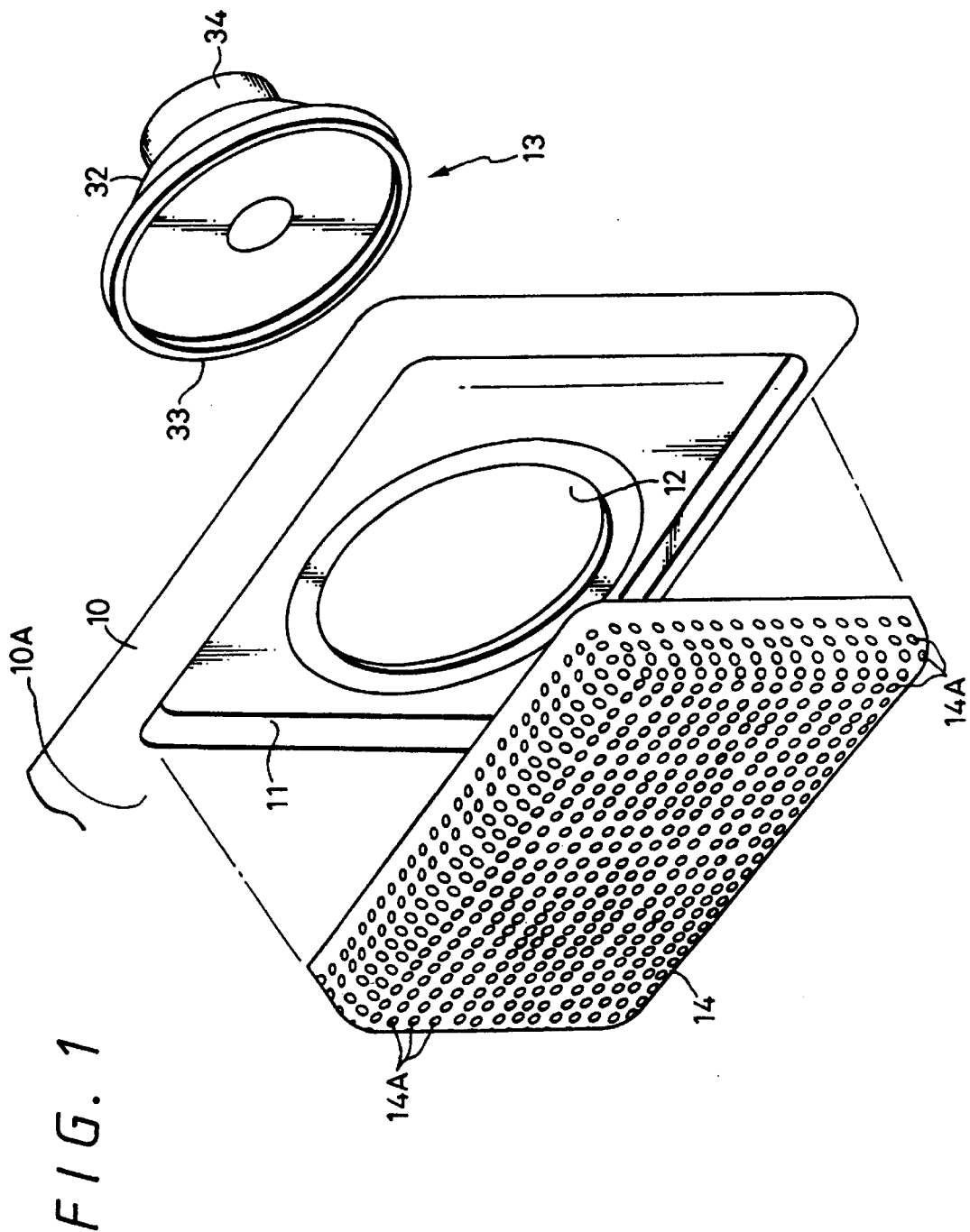
FIG. 1 is a perspective view illustrating an arrangement for attaching a speaker to a cabinet in an exploded fashion.

FIG. 1 is a perspective view illustrating a manner in which a speaker is attached to a cabinet, i.e., a speaker is attached to a front cabinet 10 of a cassette tape recorder with a radio receiver. The front cabinet 10 is molded by a thermoplastic synthetic resin such as high-impact polystyrene, and has a substantially rectangular recess 11 formed on its front surface 10A at the position opposing the speaker attachment position on its rear surface 10B. (See FIG. 2) The recess 11 has a circular opening 12 defined therein, and a speaker 13 is attached to the front cabinet 10 from its rear surface 10B so as to cover this opening 12. A protective mesh-like cover 14 is attached to the recess 11 on the front surface 10A so as to protect the speaker 13 attached to the opening 12. The opening 12 serves as an opening from which sounds from the speaker 13 are emanated.

Figure 2:
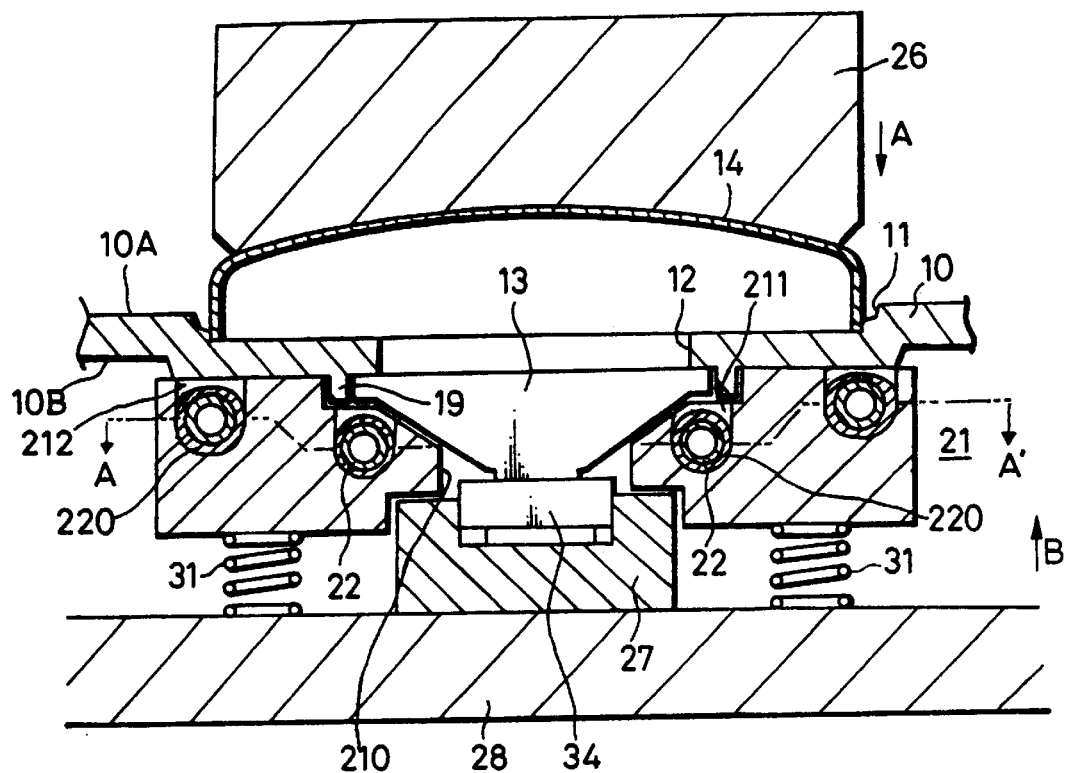
FIG. 2 is a longitudinal cross-sectional view illustrating a speaker attachment jig for attaching a speaker to a front cabinet.
Figure 4:
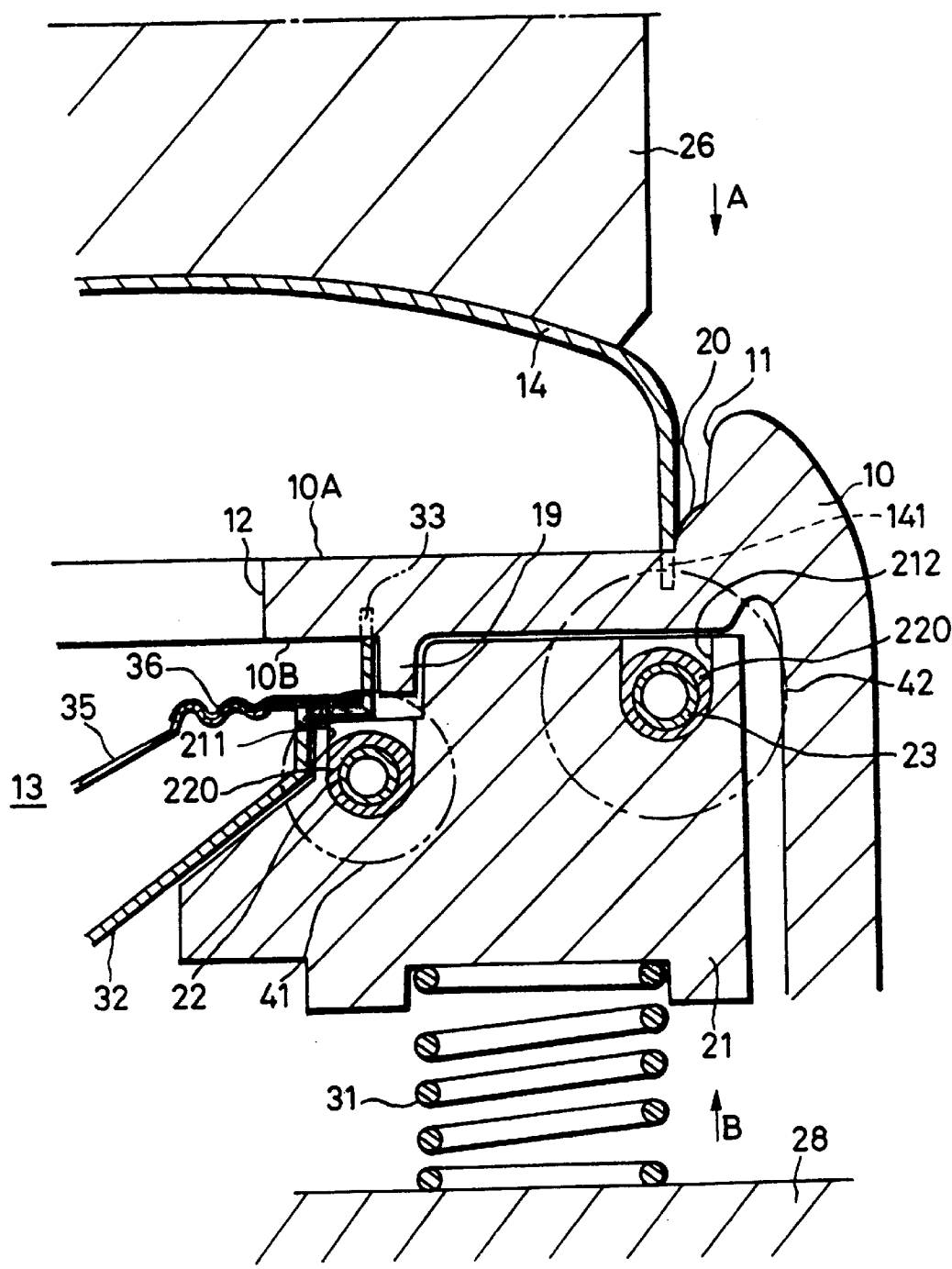
FIG. 4 is a fragmentary cross-sectional view illustrating a speaker attachment arrangement in an enlarged scale.

As shown in FIGS. 2 and 4, a cylindrical rib 19 is integrally formed with the rear surface 10B of the front cabinet 10 at the position in which the speaker 13 is attached. The cylindrical rib 19 is fitted into an outer periphery of a cylindrical elevating edge 33 of a frame 32 of the speaker 13. The speaker 13 is attached to the rear surface 10B of the front cabinet 10 via the rib 19. A part of the resin making the front cabinet 10 is fused by heating the iron frame 32 of the speaker 13 through induction using an induction heating jig 21, and the elevating edge 33 of the frame 32 of the speaker 13 is pressure-fitted into the fused front cabinet 10, resulting in the speaker 13 being attached to the front cabinet 10.

Figure 3:
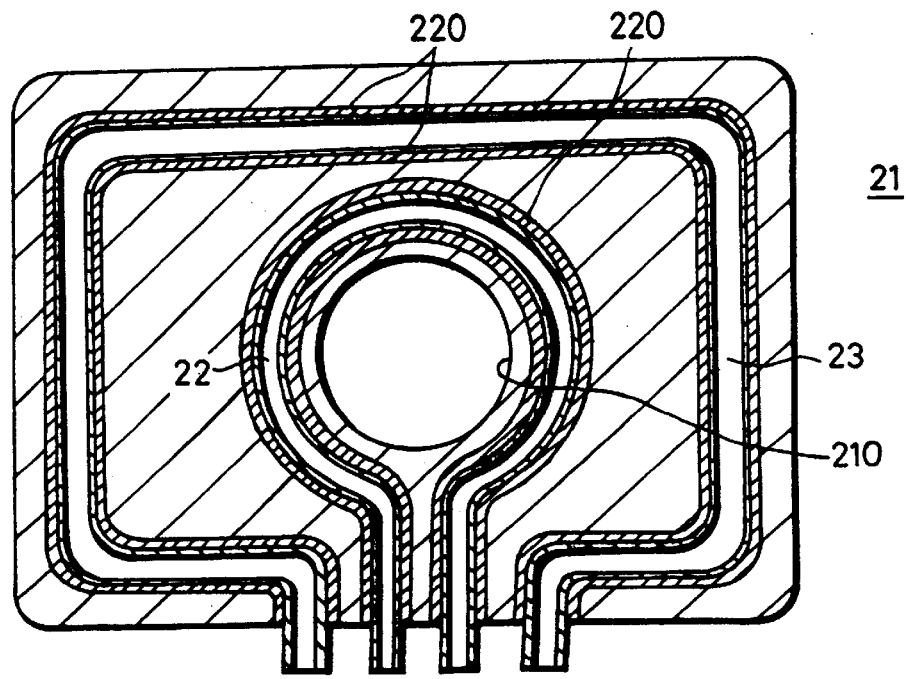
FIG. 3 is a transversal cross-sectional view illustrating the speaker attachment jig when the speaker is removed from the front cabinet.

As shown in FIGS. 2, 3 and 4, the induction heating jig 21 is formed of a block molded by bakelite, and has a center bore 210 defined at its center. Inner and outer grooves 211 and 212 are formed so as to surround the center bore 210. A copper pipe 22 is extended in the inner groove 211, and a copper pipe 23 is extended in the outer groove 212. The copper pipes 22, 23 conduct a high-frequency current of 0.8 A and 400 kHz, for example, and are cooled by cooling water flowed therethrough. The copper pipes 22, 23 are protected around their peripheries by shock-absorbing materials 220 formed of heat-resisting material such as asbestos.

The protective mesh-like cover 14 also is attached to the front surface 10A of the cabinet 10 through induction heating using the induction heating jig 21 at the same time the speaker 13 is attached to the rear surface 10B of the front cabinet 10. The protective mesh-like cover 14 that is attached to the front surface 10A of the cabinet 10 is made of a steel plate with innumerable small circular apertures 14A defined therein, and is pressed against the front surface 10A as shown by an arrow A by a pressing member 26 made of bakelite shown in FIGS. 2 and 4. A drive portion 34 of the speaker 13 is rested on a speaker mount 27 through the center bore 210 of the jig 21, and the speaker mount 27 is supported on a base 28. Under spring force of a coil spring 31, the induction heating jig 21 is spring-biased in the direction shown by the arrow B in FIG. 2, i.e., the induction heating jig 21 is urged against the rear surface 10B of the front cabinet 10.

As shown in FIGS. 2 and 4, the protective mesh-like cover 14 is disposed on the front surface 10A of the front cabinet 10, and guided at its side end portion by a guide rib 20 formed at the inside step portion of the recess 11. Then, under the condition that the speaker 13 is attached to the rear surface 10B, cooling water circulates within the copper pipes 22, 23 for preventing the temperature from rising abnormally. On application of high-frequency current to the copper pipes 22, 23, alternating magnetic fields 41, 42 are generated around the copper pipes 22, 23. As shown in FIG. 4, the alternating magnetic field 41 that was generated on application of current to the copper pipe 22 crosses the frame 32 of the speaker 13, in particular, its elevating edge 33 to flow an eddy current on the edge 33 so that the frame, in particular, the edge 33 is heated by a core loss of the edge 33. As a consequence, the front cabinet 10 made of synthetic resin is softened and fused at its rear surface 10B in contact with the edge 33 and at the inside portion of the rib 19. In this state, the frame 32 is pressed against a pressing force of the pressing member 26 under a spring force as designated by the arrow B of the coil spring 31 so that the edge 33 is fitted into the front cabinet 10.

Simultaneously, the alternating magnetic field 42 is generated around the copper pipe 23 on application of the high-frequency current to the copper pipe 23. The thus generated alternating magnetic field 42 crosses the tip end portion of the protective mesh-like cover 14, in particular, the portion in contact with the front cabinet 10 as shown in FIG. 4 so that the tip end portion of the protective mesh-like cover 14 is heated by the core loss, resulting in the front cabinet 10 being fused where it is in contact with the protective mesh-like cover 14. Therefore, the protective mesh-like cover 14 is attached to the front cabinet 10 by fusing under the condition that its tip end portion 141 is fitted into the front cabinet 10.

When the edge 33 of the frame 32 of the speaker 13 and the tip end portion 141 of the protective mesh-like cover 14 are inserted into the front cabinet 10 up to predetermined values, application of the high-frequency current to the copper pipes 22 and 23 is stopped, the pressing force of the pressing plate 26 in the arrow A direction is removed, and further the circulation of cooling water through the insides of the copper pipes 22 and 23 is started. Then, the speaker 13 and the protective mesh-like cover 14 are attached to the front cabinet 10 and are inserted into the front cabinet 10 at predetermined depths.

At the same time the speaker 13 is attached to the front cabinet 10 at its rear surface 10B by fusing through the common heating induction jig 21, the protective mesh-like cover 14 can be attached to the front cabinet 10 at its front surface 10A and recess 11.

According to the above method of attaching a speaker, assemblies such as screws, sheet metals or wire springs for attaching the speaker 13 and the protective mesh-like cover 14 are not required at all, and hence the number of assemblies can be reduced. Inasmuch as the speaker 13 and the protective mesh-like cover 14 are fixed by heating and fusing the front cabinet 10 at their corresponding portions, noisy sounds can be avoided, thereby making it possible to avoid a problem of tone quality. Furthermore, since the speaker 13 and the protective mesh-like cover 14 can be attached simultaneously, a time required for attachment work can be reduced.

When the speaker 13 is attached to the front cabinet 10 by induction heating, the elevating edge 33 of the frame 32 of the speaker 13 is heated at a very high temperature as described above. Therefore, as shown in FIG. 4, the outer surface of the peripheral edge of a diaphragm, i.e., a cone 35 should preferably be coated with a non-combustible paint 36 so that the cone 35 can be protected from heat conducted when the elevating edge 33 is heated by induction heating.

Figure 5:
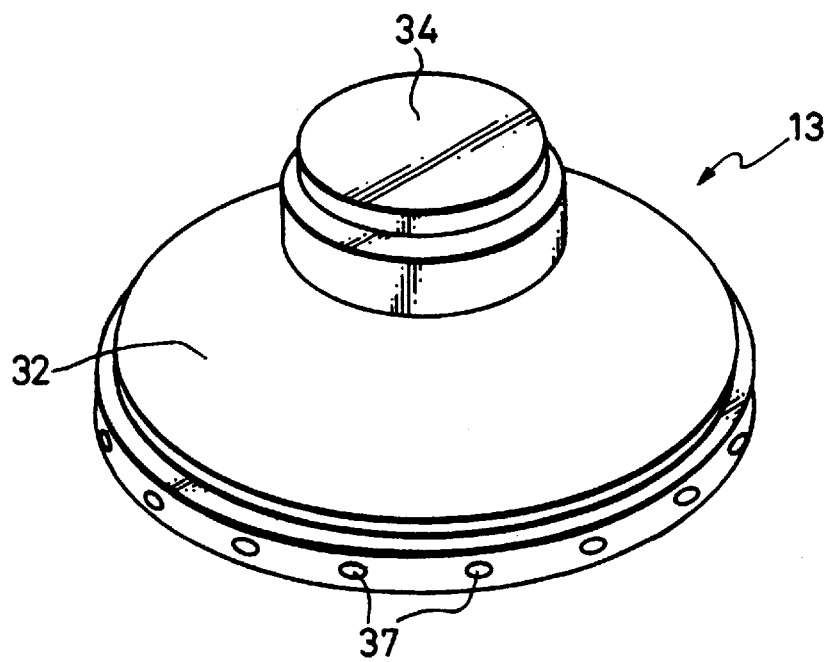
FIG. 5 is a perspective view of the speaker.
Figure 6:
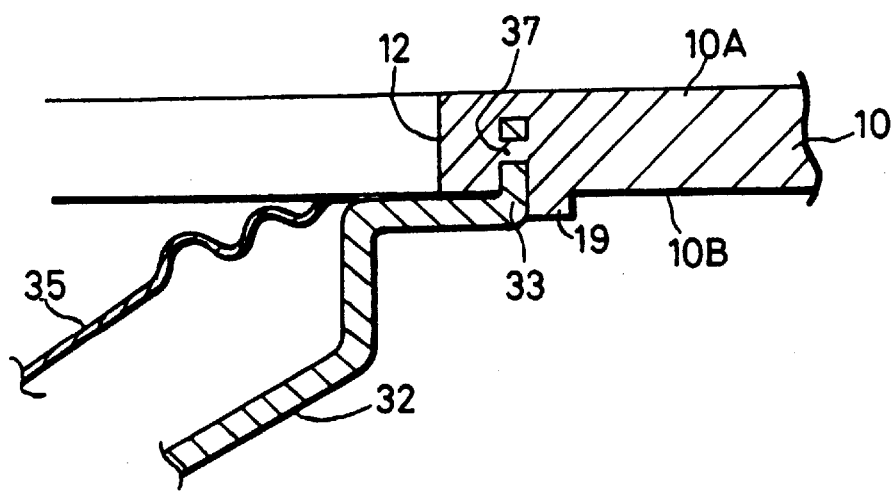
FIG. 6 is a fragmentary cross-sectional view illustrating in an enlarged scale that an edge portion of the speaker is inserted into a front cabinet.

In order to reliably attach the speaker 13 to the rear surface 10B of the front cabinet 10, openings 37 shown in FIGS. 5 and 6 should preferably be bored through the elevating edge 33 of the frame 32 with a predetermined interval. If such openings 37 are provided, then a part of synthetic resin fused by heating and fusing may enter into and engage with the openings 37, whereby the speaker 13 can be reliably attached to the front cabinet 10.

Figure 7:
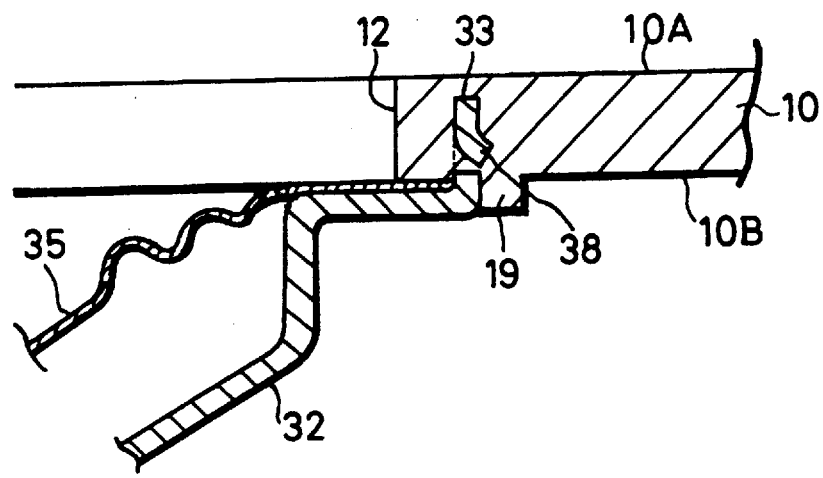
FIG. 7 is a fragmentary cross-sectional view illustrating in an enlarged scale that an edge portion of speaker is fitted into the front cabinet according to another embodiment of the present invention.
Figure 8:
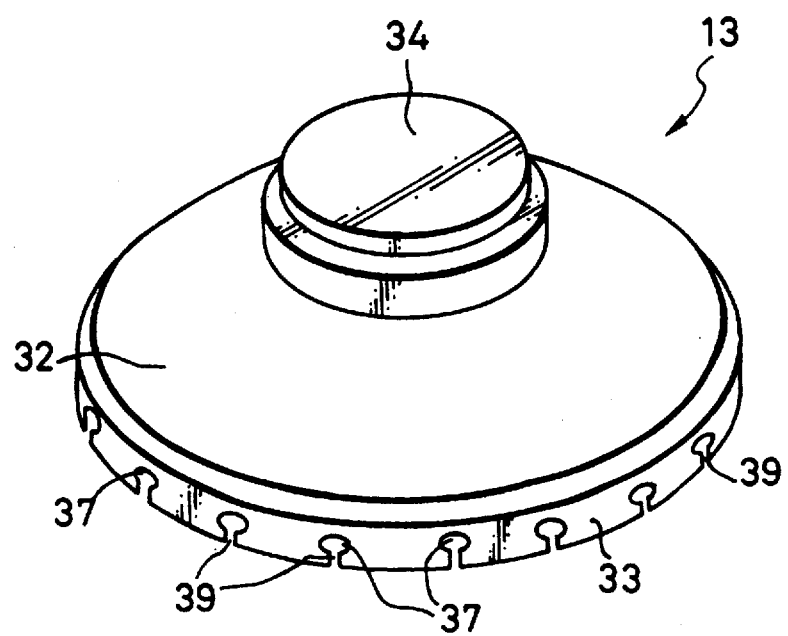
FIG. 8 is a perspective view illustrating an outer face of a speaker.

Moreover, the speaker unit 13 may be reliably attached to the front cabinet 10 by tabs 38 shown in FIG. 7 instead of the openings 37. Alternatively, the speaker unit 13 may be positively attached to the front cabinet 10 adding slits 39 (see FIG. 8) each of which is elongated from the openings 37 shown in FIGS. 5 and 6. The slit 39 is of the shape such that its tip end portion, i.e., portion which comes in contact with the front cabinet 10 is opened.

As described above, according to the present invention, there is provided a method of attaching a speaker unit to a cabinet by fusing at its location opposing the edge portion of the outer periphery of the speaker frame and fitting the edge portion into a predetermined position on the cabinet, by induction heating.

Therefore, according to the present invention, assemblies such as screws, sheet metals or wire springs for fixing the speaker unit are not required at all, thereby avoiding generation of noisy sound.

Having described preferred embodiments of the invention with reference to the accompanying drawings, it is to be understood that the invention is not limited to those precise embodiments and that various modifications and variations could be effected therein by one skilled in the art without departing from the spirit or scope of the invention as defined in the appended claims.

What is claimed is:

1. A device comprising:

a speaker;

a body formed of a thermoplastic synthetic resin having a substantially flat main surface with an opening defined therein at a position in which said speaker is attached, said opening being used to emanate sound from said speaker; and said speaker having a metal frame and an elevating edge portion of a cylindrical shape integrally formed with a tip end of said metal frame, said cylindrical elevating edge portion having a diameter larger than a diameter of said opening and smaller than dimensions of said main surface, wherein said cylindrical elevating edge portion is disposed for surrounding said opening and said speaker is attached to said main surface of said thermoplastic synthetic resin body by fitting said elevating edge portion into said main surface of said thermoplastic synthetic resin body according to fusion of said thermoplastic resin body, so that said elevating edge portion enters said main surface of said thermoplastic resin body.

2. A device according to claim 1, wherein said speaker is attached to said thermoplastic synthetic resin body by an engagement portion formed on said cylindrical elevating edge portion.

3. A device according to claim 2, wherein said engagement portion is one of an aperture and a tab.

4. A device comprising:

a body formed of a thermoplastic synthetic resin having an opening defined at a position in which said speaker is attached, said opening being used to emanate sound from said speaker; and said speaker having a metal frame and an elevating edge portion of a cylindrical shape integrally formed with a tip end of said metal frame, said cylindrical elevating edge portion having a diameter larger than a diameter of said opening, wherein said cylindrical elevating edge portion is disposed for surrounding said opening and said speaker is attached to said thermoplastic synthetic resin body by fitting said elevating edge portion into said thermoplastic synthetic resin body according to fusion of said thermoplastic resin body, and wherein at least a peripheral edge portion of a cone of said speaker is coated around with a non-combustible paint.

\* \* \* \* \*